United States Patent [19]

Tiegel

[11] 4,100,674
[45] Jul. 18, 1978

[54] METHOD FOR MAKING A SIDE TERMINAL WELD

[75] Inventor: Ralph G. Tiegel, San Carlos, Calif.

[73] Assignee: Tiegel Manufacturing Company, Belmont, Calif.

[21] Appl. No.: 764,833

[22] Filed: Feb. 2, 1977

[51] Int. Cl.² .............................................. H01M 2/22
[52] U.S. Cl. ................................. 29/623.5; 29/623.1; 429/179
[58] Field of Search .......................... 29/623.1, 623.5; 429/179, 161; 219/86

[56] References Cited

U.S. PATENT DOCUMENTS

| 2,583,575 | 1/1952 | Katz | 219/4 |
|---|---|---|---|
| 3,303,056 | 2/1967 | Sabatino et al. | 429/179 |
| 3,313,658 | 4/1967 | Sabatino et al. | 429/179 |
| 3,388,005 | 6/1968 | Hahn et al. | 429/179 |
| 3,457,118 | 7/1969 | Miller | 429/179 |
| 3,589,948 | 6/1971 | Adams | 29/623.1 |
| 3,607,441 | 9/1971 | Mix | 29/623.1 |
| 3,687,734 | 8/1972 | Orlando et al. | 429/179 |
| 3,723,699 | 3/1973 | Allen | 29/628 |
| 3,793,086 | 2/1974 | Badger | 429/179 |
| 3,798,071 | 3/1974 | Sabatino | 429/179 |
| 3,849,203 | 11/1974 | Hollis et al. | 29/623.1 |
| 3,869,316 | 3/1975 | Matter | 429/179 |
| 3,874,933 | 4/1975 | Mocas | 429/179 |

Primary Examiner—Carl E. Hall
Attorney, Agent, or Firm—Benasutti Associates, Ltd.

[57] ABSTRACT

An integral and homogeneous connection between a terminal and a battery lug is accomplished without the requirement of specially shaped projections on either of the surfaces of the terminal or lug. Insulation is disposed between the lug and terminal and a portion of the overlapping area of the lug is pressed through an opening in the insulation means to make contact over a relatively small area with the terminal. Welding jaws are used to press the lug and terminal together and a current is provided by the welding jaws to heat up the area of contact so that the lead begins to melt in the opening. Since the lug and terminal are continuously squeezed together by the welding jaws, more cold lead is introduced into the opening until the entire opening is filled with molten lead from the lug and terminal.

2 Claims, 6 Drawing Figures

METHOD FOR MAKING A SIDE TERMINAL WELD

BACKGROUND OF THE INVENTION

I. Field of the Invention

This invention pertains to a method for making terminal welds in lead storage batteries and to products produced by that method.

II. Description of the Prior Art

Lead storage batteries are often made with straps connecting the individual plates in a stack together. The strap has a vertical portion called a lug. Terminals are provided in the battery for connection of the battery to external electrical cables, the terminals in some batteries being positioned in the battery side walls. A portion of the surface of the lug overlaps a portion of the inside surface of the terminal and the two must be connected together to form a good electrical connection. In one approach, the overlapping surfaces of the lug and terminal are pressed together by welding jaws and electrically-welded connection is formed. One problem with this approach is that the overlapping area of contact creates a low electrical resistance resulting in insufficient heat at the interface causing a cold weld.

Alternatively, it is known to provide the lug portion with a projection which is inserted through a hole in a battery wall and into a hole or cavity on the terminal. A complete connection between the terminal and the lug and a good seal between the terminal, battery wall and lug is obtained by exerting pressure on either side of the connection, that is, by applying pressure against the battery lug within the battery and against the terminal outside the battery so as to squeeze them together and seal the connection against the battery wall. If desired, the step of fusing the connection together can be added by applying heat to the lug and to the terminal. See U.S. Pat. Nos. 3,457,118 and 3,303,056.

A similar approach to making electrical connections through storage battery partitions or walls within the battery case is disclosed in U.S. Pat. Nos. 3,798,071; 3,723,699; 3,687,734; 3,589,948; 3,388,005; and 3,313,658. In particular, the Allen U.S. Pat. No. 3,723,699 discloses a method of making an intercell connection by providing a lug on one side of a partition with a bar thereon which extends into a hole in the partition wall. The lug on the other side of the partition does not have a bar but has a flat surface adjacent the partition. A specially shaped electrode acts on the smooth lug, which has no bar, forcing the soft lead of the lug to press into the hole in the partition wall against the bar on the opposite lug. Then, while under pressure, a current is passed fusing the two lugs together.

Problems can occur in obtaining precise alignment between the relatively large protrusion and openings on various parts to be connected together or between the protrusions and openings in a partition wall or a battery case wall through which the protrusions must pass. In addition, the area of contact between the protrusions on one part of the surface or opening on the other part is relatively large and requires a great deal of heat in order to melt the lead and fuse the parts together to form the terminal connection.

SUMMARY OF THE INVENTION

A lead terminal is positioned within an aperture in a battery wall forming a seal therewith. The cell in the battery which is adjacent the terminal contains a group of battery plates having a lug, a portion of which is adjacent to and overlaps the inside surface of the terminal. An insulation means disposed between the lug surface and the inside terminal surface insulates at least a portion of the overlapping surface of the lug from a corresponding portion of the terminal.

Pressing the lug against the intermediate insulation means and the inside surface of the terminal creates a small area of contact between the lug and terminal over a portion of the corresponding overlapping surfaces which are not covered by the insulation means. Because the area of contact is small, heat is generated in the region when current is passed through the contact area, creating a fusion zone between the lug and terminal. Continual pressure is applied in pressing the lug and terminal surface together and additional cold lead is introduced into the fusion zone causing more lead to melt creating an integral and homogeneous connection between the lug and terminal and thereby eliminating cold welds.

Accordingly, it is an object of the invention to provide a method of making a high quality side terminal weld and to provide a product made by this weld.

This and other objects of my invention will become apparent from the following description with reference to the accompanying drawings.

DESCRIPTION OF THE PREFERRED EMBODIMENTS

Figure 1A:
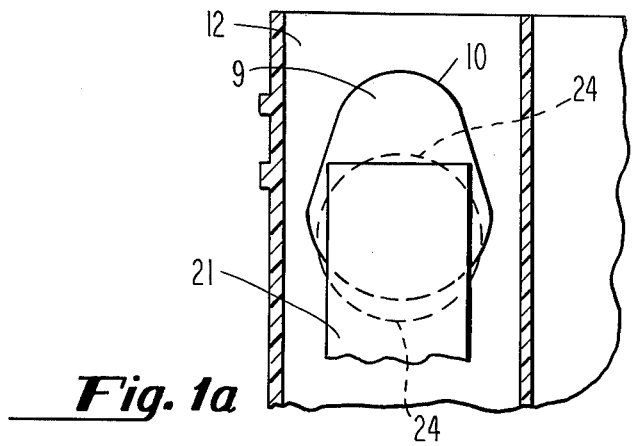
FIG. 1a is a view of the lug, terminal and battery wall, taken as indicated along the lines and arrows 1a—1a in FIG. 1.

Although specific forms of the invention have been selected for illustration in the drawings, and the following description is drawn in specific terms for the purpose of describing this invention, this description is not intended to limit the scope of the invention which is defined in the appended claims.

Figure 1:
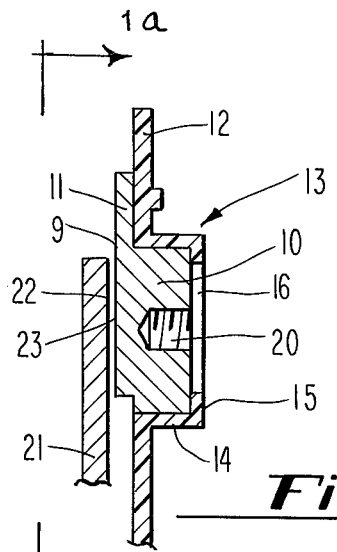
FIG. 1 is a cross-section of a terminal sealed in a battery wall adjacent to a battery lug.

Referring to FIG. 1, a portion of a battery wall 12 is shown having an aperture 16. The portion of the battery wall designated generally 13 surrounding the aperture 16 comprises a ring 14 and an inwardly depending flange 15. The ring 14 together with the inwardly depending flange 15 create a partial chamber in the battery wall 12.

A terminal 10 is contained within the partial chamber engaging the inside surfaces of the inwardly depending flange 15 and the ring 14. An extension 11 of the terminal engages the inside surface of the battery wall for a distance. In the embodiment shown here, the inside surface of the terminal 9 along its entire length is planar. The terminal is metal and may be lead alloy. Within the terminal a tapped hole 20 can be provided.

The cell containing the terminal also contains a group of battery plates with separators (not shown). A vertically extending lug 21, connected to the strap of the group, has a portion adjacent and overlapping a portion of the inside surface 9 of the terminal 10. The adjacent and overlapping surfaces of the lug and inside surfaces of the terminal are denoted 22 and 23 respectively in FIG. 1.

FIG. 1a is a view along the lines and arrows 1a—1a of FIG. 1 showing the inside surface of the battery wall 12, the inside surface 9 of the terminal 10 and a portion of the lug 21 overlapping a portion of the inside surface 9 of the terminal 10. The aperture 16 in the battery wall 12 is shown as a circular dotted line 24 in FIG. 1a.

Figure 2A:
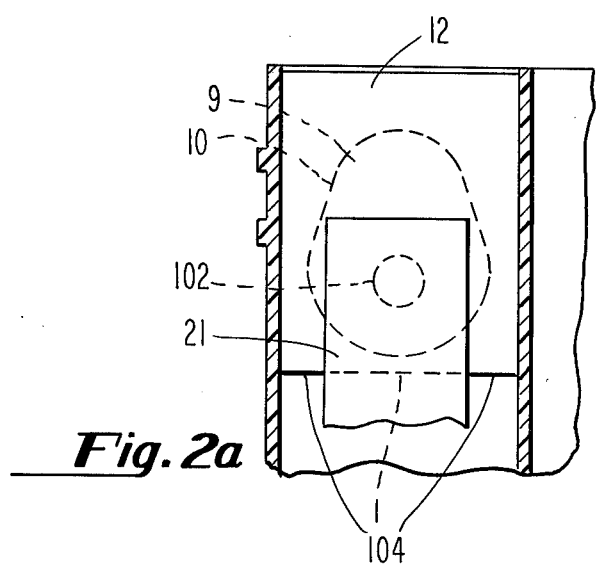
FIG. 2a is a view of the lug, insulation, terminal and battery wall, taken as indicated along the lines and arrows 2a—2a in FIG. 2.
Figure 2:
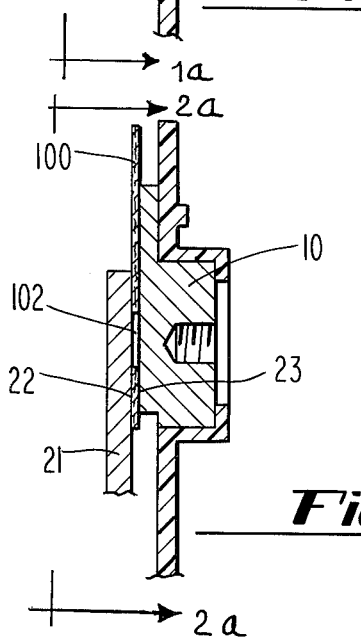
FIG. 2 is a cross-section of a lug, terminal and battery wall of FIG. 1 with the preferred embodiment insulation in place.

In FIG. 2, a preferred embodiment of the insulation means 100 is shown between the battery lug 21 and the terminal 10. The preferred embodiment insulation means 100 has an aperture 102 and, except for this, the insulation means covers the entire overlapping surfaces 22 and 23 respectively of the battery lug 21 and the terminal connector 10. This is seen more clearly in FIG. 2a where the bottom edge of the insulation means is shown as the solid line 104 partially dotted where it is overlapped by the lug 21. The aperture 102 in the insulation means 100 is shown as a dotted circle in FIG. 2a.

Figure 3:
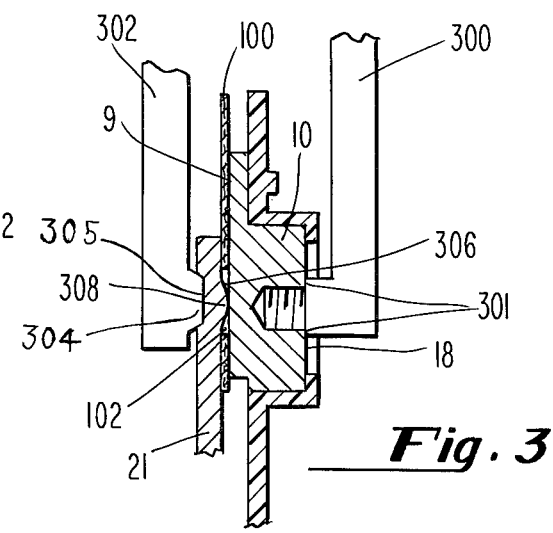
FIG. 3 is a cross-section of the lug, terminal, battery wall and preferred embodiment insulation means of FIG. 2, showing the welding jaws and an extruded portion of the lug in contact with the terminal.

In accordance with this invention, welding jaws are positioned on either side of the area to be welded. In FIG. 3, the external welding jaw 300 contacts the outside surface 18 of the terminal at 301. The internal welding jaw 302 has a protrusion 304 which is adjacent to the lug 21. The protrusion 304 engages the lug 21 on a surface 305 opposite the overlapping surface 22.

A force is applied to the welding jaws moving the welding jaws toward one another. When this happens, the protrusion 304 contacts the lug 21 along the surface 305, forcing the lug 21 to press against the insulation means 100; the external welding jaw 300, pressed against the outside surface 18 of the terminal 10 at the point 301, causes the inside surface 9 of the terminal to press against the insulation means 100. The lug 21 is made of relatively soft metal such as lead alloy and when the lug 21 is pressed against the insulation means 100, the edge of the insulation means forming the aperture 102 acts as a die so that the soft metal is extruded through the aperture 102 and contacts the inside surface of the terminal along a small contact area 308. The shape of the extension 306 can be seen in FIG. 3 along with the area of contact 308.

The preferred embodiment insulation means is a flat, relatively thin, rectangularly shaped piece of material which is capable of electrically insulating the portion 22 of the lug surface which overlaps a portion 23 of the terminal 10. At the same time, it acts to space apart the overlapping surfaces of the lug and terminal and to thermally insulate one surface from the opposing surface. The insulation means must be capable of withstanding the compression-like force of the welding jaws and the extrusion of lead through the aperture 102.

Figure 4:
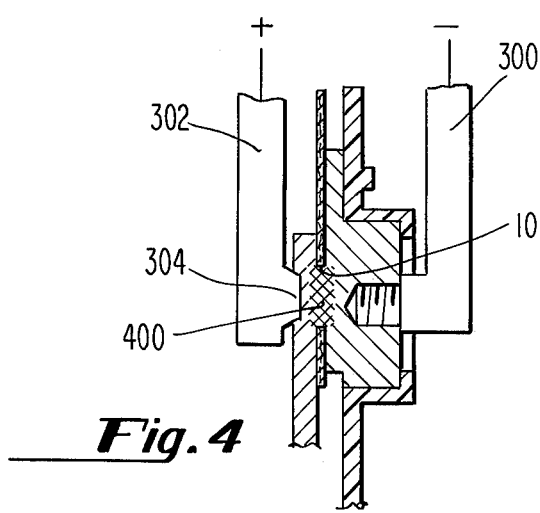
FIG. 4 is a cross-section of the preferred embodiment of FIG. 3 with an electrical potential shown schematically applied across the welding jaws and showing the integral and homogeneous connection between the lug and terminal being fused.

When an electrical potential is applied across the welding jaws 302 and 300 as signified by the plus and minus signs in FIG. 4, current begins to flow between the metal lug and the metal terminal through the relatively small contact area 308 of FIG. 3 thereby generating a large amount of heat in that region and causing the lead of the lug and terminal to melt, forming a fusion zone 400, shown cross-hatched in FIG. 4. However, the welding jaws continue to apply a compressive-type force squeezing the lug and the terminal together and more cold metal or lead is introduced into the fusion zone in the aperature 102. As current continues to flow and more lead continues to melt, the entire aperture within the insulation means is filled with molten lead to form a homogeneous and integral connection in the fusion zone 400 between the lug 21 and the terminal 10. The current flow is stopped and the welding jaws are retracted leaving the lug connected to the terminal.

It is important to note that no projections were present on either the terminal or the lug which might result in requirements for precise alignment and mating of the projection with either the lug or terminal necessitating the implementation of elaborate alignment procedures each time a different size battery was introduced for terminal welding. Instead, in the preferred embodiment a projection 304 is provided on the internal welding jaw 302 which presses against a substantially planar surface of the lug. The other planar surface of the lug 21 presses against a relatively flat insulation means 100 which can be positioned quite easily to have its aperature 102 align with the projection on the welding jaw.

In an alternate embodiment of this invention, a battery case can be injection molded to include plastic around the terminal connector leaving an aperture 102 and thereby eliminate the separate insulation means from the battery. However, with the separate preferred embodiment insulation means of this invention, there is no need to provide different terminal post sizes for different plate heights in different size batteries since the insulation means can be moved easily to accommodate a common terminal post. For example, a series of batteries with identical side wall terminal configurations, but with different size plate heights and lug lengths, might be presented for side terminal welding. A smaller lug, in the area of the terminal overlap, will not extend as far toward the battery top as a longer lug. With the preferred embodiment insulation means of this invention, the insulation means can be moved to insure that the aperture 102 will be positioned between the common terminal and either the longer lug or the shorter lug without the need of varying the common terminal configuration.

In one embodiment of the electrical insulation means, a paper tape or piece of cardboard with an aperture is provided with glue or adhesive already applied to one side or surface. This is pasted to the terminal after the terminal is assembled into the battery wall but before the groups of plates and separators are added to the cells in the battery.

In lead storage batteries for automobiles, the groups of plates within each cell are connected through partitions contained within each battery by forming intercell connections, the cross-sectional area of which is a typical area of 0.4 to 0.5 square inches. In such a battery, the aperture within the insulation means, which ultimately becomes filled with the homogeneous and integral connector formed between the lug and terminal, is of the same cross-sectional area of 0.4 to 0.5 square inches. In applicant's preferred embodiment, the aperture in the paper tape or card is circular and has a diameter of 0.375 inches. It will be seen that this aperture can easily be varied to provide a lug terminal connection equal to the battery intercell connections for a variety of lead storage batteries.

In the preferred embodiment, a battery contains apertures 16 through the wall 12 of the battery case. Within the apertures formed in the wall 12 of the battery case, terminals 10 are assembled which sealingly engage the battery walls 12. A piece of paper tape or cardboard 100 having a circular aperture 102 therethrough adheres to the inside surface 9 of the terminal 10 in the battery aperture 16. A group of plates, inserted into the cell containing the terminal, has a lug 21, which extends upward from the plates adjacent to and overlapping the insulation card 100 pasted on the inside surface 9 of the terminal 10. Welding jaws 300 and 302 are then brought into contact with the terminal 10 and lug 21, the external welding jaw 300 pressing against the outer surface 18 of the terminal 10 and the internal welding jaw 302 having a projection 304 thereon which presses against a surface of a lug. The lug 21 is so positioned relative to the insulation 100 and terminal 10 that a portion 22 of the lug surface overlaps a corresponding portion 23 of the inside surface 9 of the terminal 10. The insulation means 100 covers an area which includes all of this overlapping surface 22 of the lug except for the aperture 102. As the welding jaws squeeze, the lug contacts the edge of the aperture 102 in the insulation material 100 and the soft metal begins to extrude through the aperture 102 to contact the inside surface 9 of the terminal 10. The area of contact 308 is quite small compared to the area of the aperture 102 in the insulation 100. When electrical potential is applied to the welding jaws, a current begins to flow through this small contact thereby creating a great amount of heat. The insulation surrounding the aperture not only provides an electrical insulation so that only a small area of contact is provided between the lug and the terminal, but also provides a means of concentrating the heat at the point of contact by acting as both an electrical and heat insulator. This concentration of the heat creates molten lead at the point of contact and with the jaws continually applying pressure to the lug and terminal, squeezing them together, more cold lead is extruded into the aperture 102 where it melts forming an integral and homogeneous connection 400 between the lug and terminal.

It will be understood that various changes in the details, materials and arrangment of parts which have been herein described and illustrated in order to explain the nature of this invention, may be made by those skilled in the art within the principal and scope of the invention as expressed in the following claims.

I claim:

1. A method for connecting battery terminals to battery lugs in a battery, said battery having a case having at least one terminal through a wall thereof, said battery case having at least one group of battery plates within a cell, said group having at least one strap having a portion of a lug disposed adjacent and overlapping at least a portion of an interior surface of said terminal, said method comprising:
    (a) providing insulating material with an aperture defined therein, between a portion of said overlapping lug surface and said adjacent interior terminal surface;
    (b) pressing a portion of said overlapping portion of said lug to extrude said portion of said lug through said aperture to contact said terminal; and
    (c) resistance welding at least that portion of said lug to said terminal which contacts said terminal to form an integral connector between said terminal and said lug.

2. The invention of claim 1 wherein said method comprises the step of positioning at least one internal welding jaw inside said battery case and at least one outer welding jaw outside said battery case, said internal jaw having a projection thereon, said projection adjacent the opposite surface of said overlapping surface of said lug and said projection aligned with said aperture.

* * * * *